Nov. 16, 1926.  1,606,964
J. A. SEXAUER
DOUGH MOLDING MACHINE
Filed August 21, 1923
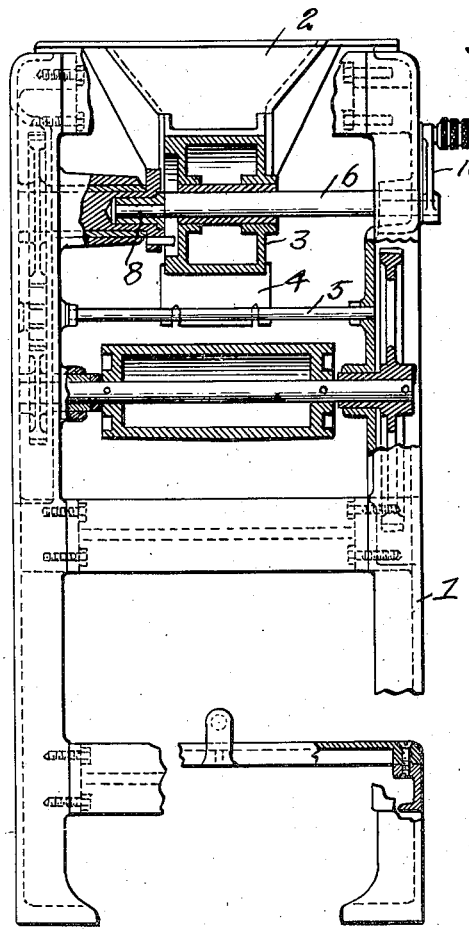
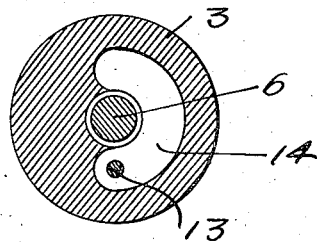
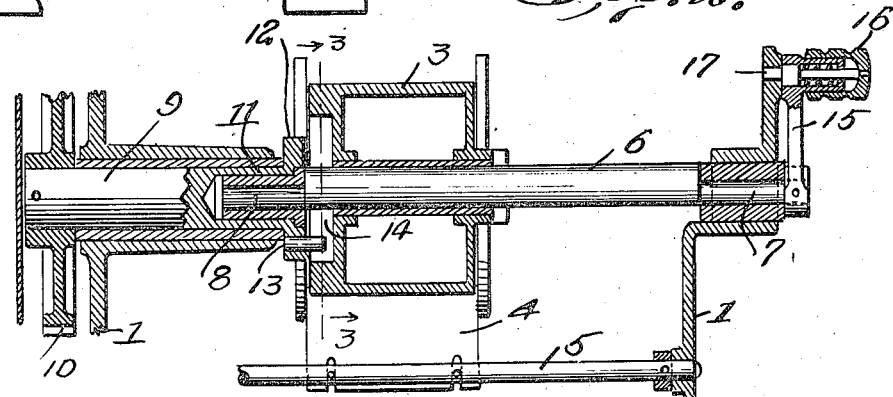
INVENTOR.
John A. Sexauer,
BY
ATTORNEYS.

Patented Nov. 16, 1926.

1,606,964

UNITED STATES PATENT OFFICE.

JOHN ALTHOFF SEXAUER, OF SIDNEY, OHIO.

DOUGH-MOLDING MACHINE.

Application filed August 21, 1923. Serial No. 658,554.

This invention relates to a dough molding machine, and the object of the invention is the improvement of the construction of a mechanism for molding or kneading dough.

Another object of the invention is the improvement of the machine disclosed in my prior Patent, No. 1,430,265, patented September 26, 1922.

With these and other objects in view, my invention comprises certain novel combinations, constructions and arrangements of parts as will be hereinafter described, illustrated in the accompanying drawings, and more particularly pointed out in the appended claims. In the drawings:

Figure 1 is a view partly in elevation and partly in section of a dough molding machine showing my invention.

Figure 2 is an enlarged fragmentary sectional view of the machine showing particularly the eccentric shaft and a roller mounted thereon.

Figure 3 is a sectional view taken on line 3, 3, Figure 2, looking in the direction of the arrows.

Referring to the drawings by numerals, 1 designates the frame of the machine, upon which is mounted the hopper 2, into which hopper 2 are placed pieces or strips of dough.

Directly under the hopper 2 are placed compression rollers, such as roller 3. Against roller 3 bears a scraper 4, carried by shaft 5.

Roller 3 is loosely mounted on eccentric shaft 6. This eccentric shaft 6 has eccentrically mounted stub shafts 7 and 8 on its ends. Stub shaft 8 is journalled in sleeve 9 while the stub shaft 7 is suitably journalled upon frame 1. On driving sleeve 9 is fastened gear 10. In sleeve 9 and around stub shaft 8 is sleeve 11. On the inner end of sleeve 9 is flange 12 from which flange projects horizontal pin 13.

The pin 13 extends into curved pocket 14 formed in one side of roller 3 (Fig. 3).

Secured to the outer end of stub shaft 7 is an operating handle 15, upon the end of which handle is formed grip 16. Grip 16 includes a spring pressed plunger 17; plunger 17 enters a portion of frame 1 for holding the handle 15 in a stationary position.

The pocket 14, in the side of roller 3, is of sufficient size to allow the pin 13 to move free enough therein to allow the adjustment of the shaft 6 by handle 15, yet upon rotation of the driving sleeve 9, the pin 13 will strike against an end of the pocket 14, and thereby roller 3 will be "picked-up" and will rotate with said driving sleeve 9.

It will be understood that on movement of the handle 15, the shaft 6 will turn in its bearings and due to the eccentricity of portions 7 and 8, the roller 3 will be adjusted towards the co-operating member to lengthen or shorten the distance between the same, and which movement of the pin 13 is allowed in the slot 14 by reason of its width.

While I have described the preferred embodiment of my invention and have illustrated the same in the accompanying drawings, certain minor changes or alterations may appear to one skilled in the art to which this invention relates, during the extensive manufacture of the same, and I, therefore, reserve the right to make such alterations or changes as shall fairly fall within the scope of the appended claims.

What I claim is:

1. In a machine of the class described, the combination with a frame, of an eccentric shaft provided with a stub shaft on its inner end mounted upon said frame, a roller loosely mounted on said eccentric shaft, said roller provided in one of its vertical sides with a pocket extending partially about its circumference, a flanged sleeve journalled upon one side of said frame and surrounding said stub shaft of the eccentric shaft, a pin on the flange of said sleeve and extending into said side pocket of the roller, and means connected to said flanged sleeve for rotating the same.

2. In a machine of the class described, the combination with a frame, of an eccentric shaft journalled at one end upon the frame and extending inwardly and terminating in a horizontal stub shaft eccentrically mounted on said eccentric shaft, a flanged sleeve journalled upon the opposite side of the frame, and surrounding at its inner end said eccentrically mounted stub shaft, a roller on said eccentric shaft provided with a side pocket, and means extending from said flanged sleeve into said pocket of said roller whereby the flanged sleeve will have a slight independent rotary movement of the roller and yet will "pick" up and rotate said roller when continuous rotary movement is imparted to the flanged sleeve.

3. In a machine of the class described, the combination with a frame, of a horizontal shaft journalled on one side of said frame and having its inner end extending inwardly of the frame, a horizontal stub shaft eccentrically mounted on the inner end of said horizontal shaft, a roller loosely mounted on said horizontal shaft, said roller provided in one of its vertical sides with a pocket extending partially around its circumference, a sleeve fitted on said stub shaft, a flanged sleeve journalled on one side of said frame and surrounding said sleeve on said stub shaft, a pin extending from the flange of said flanged sleeve and having its outer end within said pocket of said roller, and means for imparting rotary movement to said flanged sleeve and shaft, substantially as shown and described.

In testimony whereof I hereunto affix my signature.

JOHN ALTHOFF SEXAUER.